United States Patent
Gramss

(10) Patent No.: US 6,422,542 B2
(45) Date of Patent: Jul. 23, 2002

(54) AIR DAMPER FOR MOVABLE ELEMENTS, IN PARTICULAR IN AUTOMOBILES

(75) Inventor: Rainer Gramss, Iserlohn (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/725,066

(22) Filed: Nov. 29, 2000

(30) Foreign Application Priority Data

Jan. 11, 2000 (DE) .......................................... 100 00 731

(51) Int. Cl.⁷ .................................................. F16F 9/04
(52) U.S. Cl. ................................ 267/64.24; 267/64.27; 267/122
(58) Field of Search ........................... 267/64.19, 64.21, 267/64.23, 64.24, 64.27, 122; 16/84

(56) References Cited

U.S. PATENT DOCUMENTS

| 4,407,491 A | * | 10/1983 | Kinihiro et al. | ....... 267/140.11 |
| 4,596,427 A | * | 6/1986 | Pflugfelder | ................. 312/319 |
| 4,722,516 A |   | 2/1988 | Van Breemen |   |
| 4,844,429 A | * | 7/1989 | Ecktman | ................... 267/64.24 |
| 5,029,401 A | * | 7/1991 | Masom | ..................... 267/64.27 |
| 5,060,917 A | * | 10/1991 | DuBos et al. | .......... 267/140.11 |
| 5,328,005 A |   | 7/1994 | Gregg |   |
| 5,333,845 A | * | 8/1994 | Seiichi | ........................ 267/70 |
| 6,062,352 A | * | 5/2000 | Shinozali et al. | ........... 267/120 |

FOREIGN PATENT DOCUMENTS

| DE | 295 18 171 | 2/1996 |
| GB | 766024 | 1/1957 |
| GB | 1 344 909 | 1/1974 |
| GB | 1 378 186 | 12/1974 |
| GB | 2 033 532 | 5/1980 |

* cited by examiner

Primary Examiner—Paul N. Dickson
Assistant Examiner—Robert A. Siconolfi
(74) Attorney, Agent, or Firm—Lowe Hauptman Gilman & Berner, LLP

(57) ABSTRACT

The invention relates to an air-controlled damper which attenuates the motion of movable components. Sealing between the movable components is effected by a separation means which is fixed to the cylinder and the piston in the hollow space of the cylinder.

23 Claims, 2 Drawing Sheets

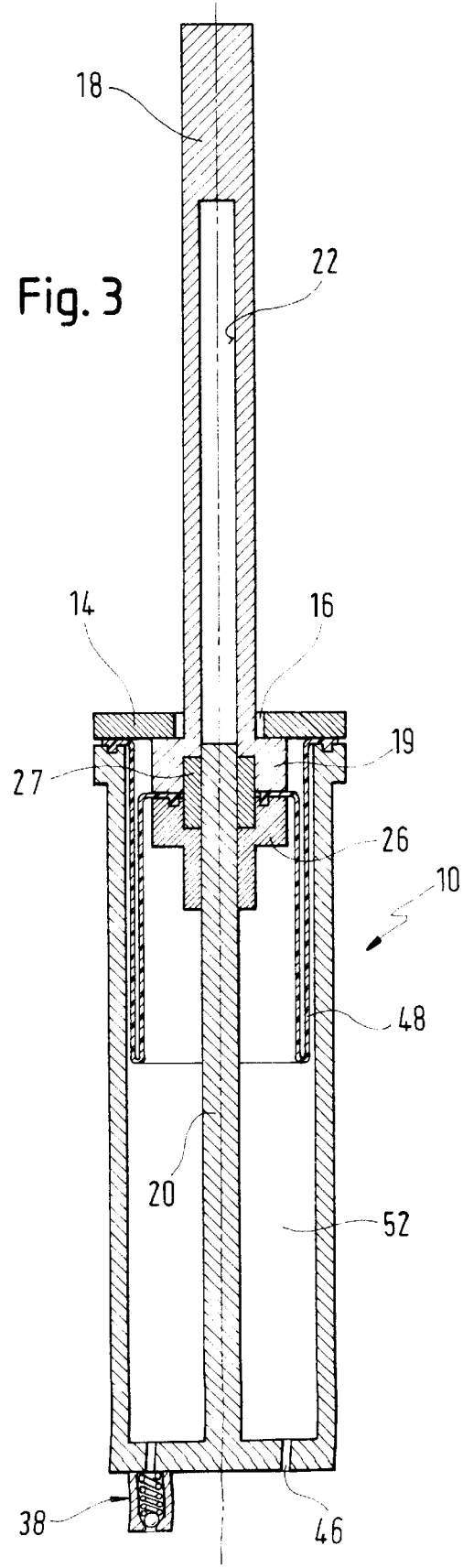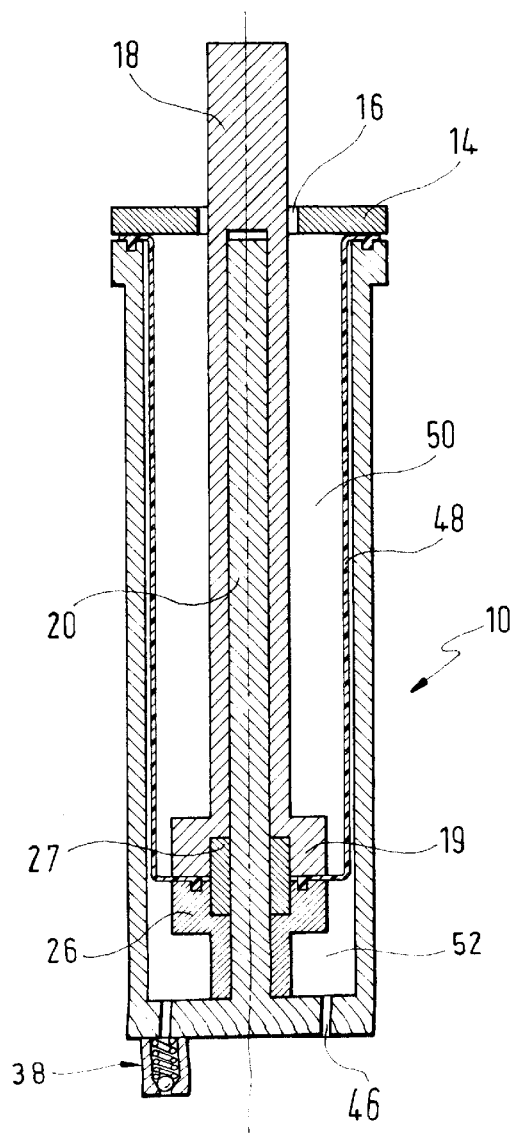

AIR DAMPER FOR MOVABLE ELEMENTS, IN PARTICULAR IN AUTOMOBILES

The invention relates an air damper for movable elements, in particular in automobiles, comprising a hollow cylinder which is open at one end thereof and a piston which is slidably guided within the cylinder in a longitudinal direction thereof.

It is known, for example, to damp the covers of gloveboxes by means of suitable damping elements. The unlocked cover, by virtue of its own weight, automatically pivots to the opened position with the opening motion being attenuated by a damper. In this conjunction, rotary dampers have become known in which a rotor is rotatably disposed in a casing with the rotor, in a cavity of the casing, being immersed into a viscous medium such as silicone oil or silicone grease, and rotating therein. The rotation-damping element has a pinion which interacts with a toothed rack. Thus, displacing the toothed rack will result in a rotation of the rotation damper or rotor which is attenuated accordingly.

The utility model DE 295 18 171 has made known a damping element including a piston which is slidably guided in a longitudinal direction thereof. The piston separates the cylinder into two regions which are interconnected by a groove extending in the longitudinal direction of the cylinder in the piston. The cross-section of flow from one cylinder space to the other may be chosen differently so that a choking of the flow of air and, hence, an attenuation of the piston motion is achieved in this way. A drawback of the air dampers which have become known are the differing damping performance caused by tolerances.

It is the object of the invention to provide an air damper which is comprised of few components and has reproducible attenuation characteristics.

According to the invention, the object is attained by the features of claim 1.

The separation means fixed to the piston and the cylinder inside wall separates the hollow space of the cylinder into a first and a second portion which are arranged adjacent to each other in the longitudinal direction. These portions define two cylinder spaces the volumes of which depend on the position of the piston in the cylinder. The length of the element connecting the points of fixation is adjustable. The first one of the portions is in communication with the atmosphere so that if its volume changes it will exchange its air with the atmosphere. The second portion defined by the separation means is arranged adjacent to the bottom of the cylinder. The second portion has at least one opening for the flow of air wherein the opening may be provided in the cylinder and/or the piston. For an attenuation, the piston is guided within the hollow space of the cylinder in the longitudinal direction of the cylinder with the air exiting in a choked state through the opening from the second portion, which leads to an attenuation of the piston motion. Likewise, air which flows in and is delayed by the opening, attenuates the motion of the piston if the volume of the second portion is increased.

In a preferred aspect of the invention, the opening in the second portion is provided at the bottom of the cylinder. In this arrangement of the opening, air will exit from and enter the cylinder in a longitudinal direction. Consequently, it is possible for the air to enter and exit throughout the lifting operation of the piston.

It is advantageous to fit the opening with at least one inlet valve for passing a predetermined flow of admission air therethrough. The valve enables a flow of air to enter the second portion so that if the volume of the second portion increases the speed of motion may be controlled by means of the flow opening of the inlet valve.

Advantageously, the inlet valve is provided as a check valve which blocks a flow out of the cylinder and in which a valve body is biased by a spring means towards the inlet direction. The effect of the biased valve body is that a flow of air will commence only following a certain increase in volume.

The inventive air damper advantageously has at least one bore for passing a predetermined flow of entering and exiting air therethrough. Such a calibrated bore determines the damping characteristics for either direction of piston displacement. If the inlet valve is additionally provided also in the second portion its effect will add to the effect of the calibrated bore if the piston is extracted.

Expediently, the separation means is formed from an elastomer. The separation means thus formed may adapt to the piston position if the piston undergoes a displacement. Also, such a separation means is easy to manufacture and is of a tightness sufficient to separate the first and second portions from each other.

In an advantageous aspect of the invention, the separation means is designed as a bellows which is extendable in the longitudinal direction. The bellows is extended when the piston is in a completely retracted position and is contracted when the piston is in a respective extracted position. The bellows may be dimensioned in its length such that it exerts a restoring spring force when in its extended position, i.e. when the limit of the stroke of the piston is reached.

In another aspect of the inventive air damper which is advantageous as well the separation means is designed as a rolling diaphragm. The rolling diaphragm will adapt as well to the position of the piston within the cylinder so that a separation of the portions within the hollow space of the cylinder will be effected only in a flexible manner.

The separation means preferably is in communication with the hollow space of the cylinder at the open end thereof. The communication of the separation means with the hollow space of the cylinder at the open end thereof causes the change in volume to be as large as possible if the piston is displaced in order to achieve sufficient attenuation.

For a fixation of the separation means, one end of the separation means is clamped between an end surface of the cylinder and a cover plate on the cylinder end surface. The separation means is held here on the cylinder end surface.

For a fixation of the separation means, the end-surface border of the cylinder has a circumferential groove which is engaged by a circumferential rib of the separation means. In this type of a location device, the separation means has disposed its rib in the groove on the end surface of the cylinder and the cover plate is clamped on the cylinder, which clamps the separation means.

The outer diameter of the piston is smaller than the inner diameter of the cylinder so that a precise-fit manufacture of the piston or a seal between the piston and the cylinder wall is not required.

Advantageously, the piston and the piston rod comprise an axial bore into which a rod is inserted which centrally extends into the hollow space of the cylinder. The piston may be guided here on the rod. The rod imparts large stability to the damper against cross forces applied to the piston rod.

In a particularly preferred aspect, the piston comprises two sections with one end of the separation means being clamped between the sections. Apart from the piston rod, the sections may serve as a guide for the piston as well. Expediently, the piston is guided through the section facing away from the separation means.

For a connection of the separation means to the piston, one of the sections comprises a circumferential groove which is open in an axial direction and is engaged by a circumferential rib of the separation means. The sections of the pistons may be interconnected by being welded together and/or being joined by an adhesive, which depends on the material chosen. Preferably, the cylinder and the piston are formed from a plastic material.

Two embodiments of the inventive air damper will now be described in detail with reference to the drawings.

FIG. 3 shows an inventive air damper including a rolling diaphragm with the piston in an extracted position.

FIG. 4 shows the air damper of FIG. 3 with the piston in an retracted position.

Figure 1:
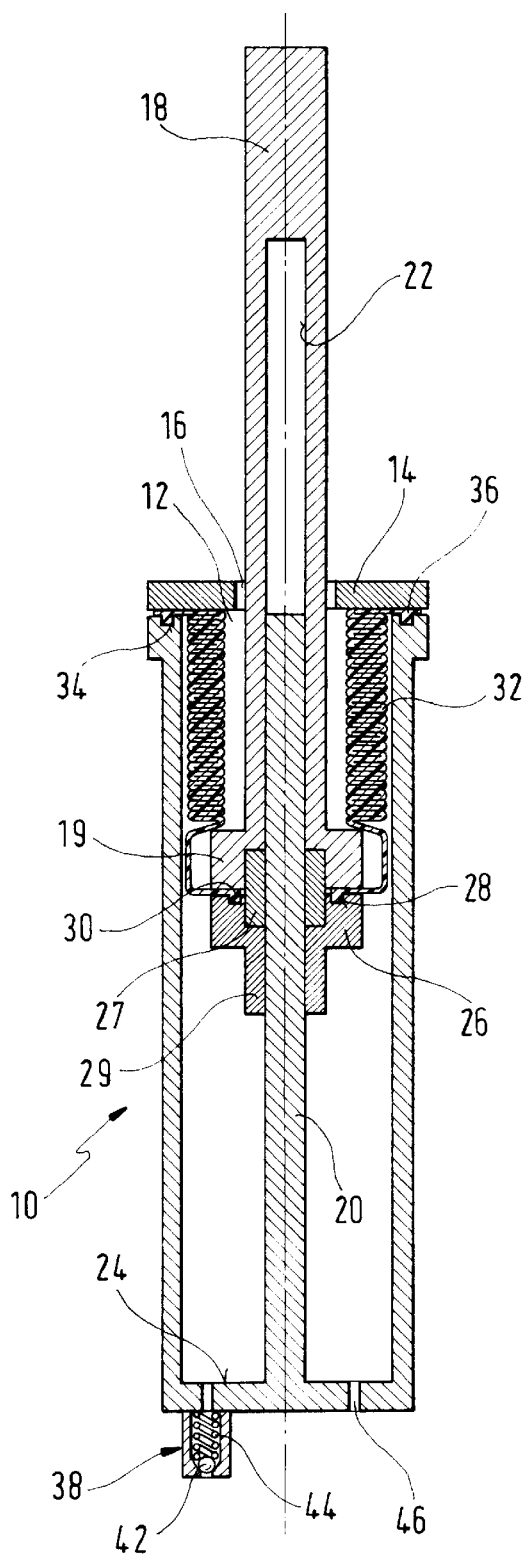
FIG. 1 shows a longitudinal section of an air damper including a bellows with the piston in an extracted position.

Referring to FIG. 1, a cylinder 10 can be seen which is open at one end at 12. Provided at the open end 12 is a closing cap 14 which is of the same outer diameter as the cylinder 10. In its central portion, the closing cap 14 has an aperture 16 through which a piston rod 18 extends. The closing cap 14 may be welded or joined to the end surface of the cylinder by an adhesive with a fixation also being possible by using bolts or clips.

A piston 19 which is guided on a guide rod 20 slides in the cylinder 10. The piston 19 has a central bore 22 which continues to end in the piston rod 18. The piston 19 and the piston rod 18 are disposed on the rod 20 so that this one is introduced into the bore 22. The rod 20 extends from the cylinder bottom 24 up to the open end 12 of the cylinder 10.

A piston guide 26 is connected to the piston 19 at the end facing the bottom of the cylinder. The piston guide 26 has a circumferential groove 28 facing the cylinder aperture 12 in which a rib 30 of the bellows 32 is seated. The piston guide 26 is of an outer diameter which equals the outer diameter of the adjoining section. In the embodiment illustrated, the piston is shown as comprising three parts altogether wherein guidance may also be performed by the cylindrical piston sleeve 27. The piston sleeve 27 is of an outer diameter which fits into a recess defined by the piston guide 26 and the piston rod 18, by which fact the piston sleeve 27 is completely surrounded by the other piston sections. In an axial direction, the piston sleeve 27 is also held in the piston guide and in the piston by the recess.

Figure 2:
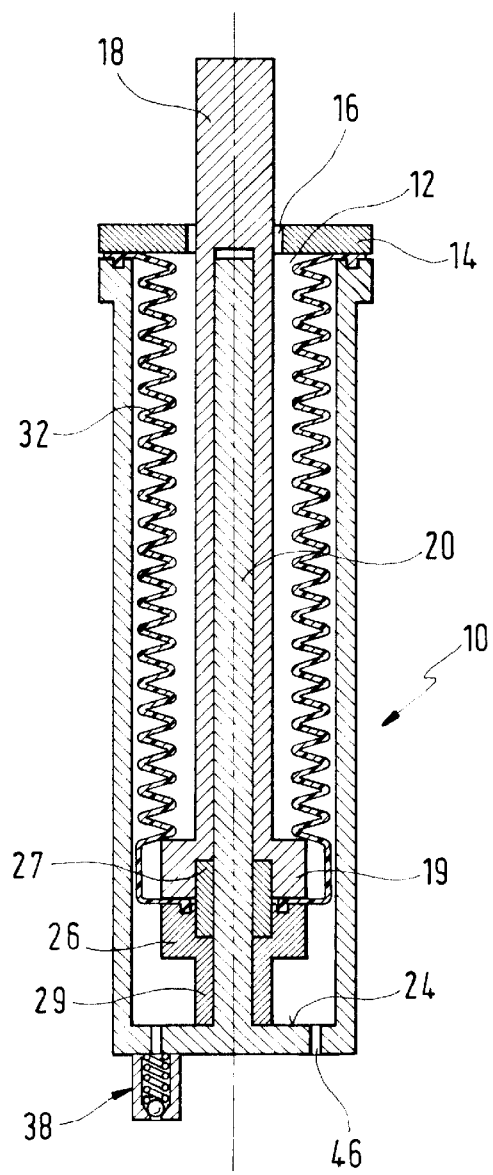
FIG. 2 shows a longitudinal section of an inventive air damper including a bellows with the piston in an retracted position.

FIG. 1 shows the piston 19 in its extracted position in which the bellows 32 is contracted whereas FIG. 2 shows the piston 19 in the contracted position in which the bellows 32 is extended. The bellows 32 may be dimensioned here in such a way that it produces a restoring spring force upon completion of the stroke (position in FIG. 2). If the piston 18 is in its retracted position the piston guide 26 abuts against the bottom 24 of the cylinder.

For an abutting action on the bottom 24, the piston guide 27 has an axial collar 29. The bellows 32 is supported at the open end 12 of the cylinder 10 in a groove 34 in the end surface. The separation means 32 is also supported in the groove 34 by a circumferential collar 36 extending along the bellows 36 which is held in the groove 34 by the front cap 14.

An inlet valve 38 is provided at the bottom 24. The inlet valve 38 has a ball 42 which is pressed by a spring 44 against a cone-shaped valve seat. If the piston is drawn from the position shown in FIG. 2 into the position shown in FIG. 1 air will be sucked into the cylinder through the inlet valve 38.

In addition to the inlet valve 38, an aperture 46 is provided at the bottom 24. If the piston 18 is extracted air will flow into the cylinder through the aperture 46, which air will flow out if the piston 18 is retracted into the cylinder. Valve 38 and opening 46 jointly determine the damping characteristics while the damper is extracted whereas the opening 46 alone determines the damping characteristics while the piston is retracted. For an attenuation while the piston is retracted, the aperture 46 has a diameter smaller than that of the inlet of the valve 38.

FIGS. 3 and 4 show an embodiment of the air damper 10 including a rolling diaphragm 48. In the Figures, identical parts are indicated by identical reference numbers. The rolling diaphragm 48 separates the hollow space of the cylinder 10 into a portion 50 and a portion 52. The portion 50 is in communication with the atmosphere via the opening 16 in the front cap 14. The portion 52 is in communication with the atmosphere via the valve 38 and the aperture 46.

If an inventive air damper is employed the end of the piston rod 18 projecting from the cylinder 10, for example, is joined by a hinge to the cover of a glovebox (not shown) whilst the cylinder 10 itself is mounted on the wall of the glovebox.

What is claimed is:

1. An air damper, comprising:
   a casing defining therein a hollow space;
   a piston slidably guided within said casing in a longitudinal direction thereof;
   a flexible separation member fixed to said piston and said casing and separating the hollow space of the casing into first and second chambers which are arranged adjacent to each other in said longitudinal direction, said first and second chambers being in communication with an outside of the casing via first and second openings, respectively; and
   a check valve placed in the second opening for blocking a flow out of said casing and passing a flow in said casing.

2. The air damper of claim 1, wherein said casing is a cylinder and the second opening is provided at the bottom of said cylinder.

3. The air damper of claim 1, wherein said check valve comprises a valve body which is biased outwardly, towards the second opening.

4. The air damper of claim 1, wherein the second chambers is also communicated with the outside of said casing via a bore for allowing air to go both in and out of said casing.

5. The air damper of claim 1, wherein said separation member is formed from an elastomer.

6. The air damper of claim 1, wherein said separation member comprises a bellows which is extendable in the longitudinal direction of said casing.

7. The air damper of claim 6, wherein the length of said separation member is dimensioned such that a spring force is exerted on said piston when the limit of the stroke of said piston is reached.

8. The air damper of claim 1, wherein said separation member comprises a rolling diaphragm.

9. The air damper of claim 1, wherein an outer diameter of said piston is smaller than an inner diameter of said casing.

10. The air damper of claim 1, wherein said piston has a through bore extending in the longitudinal direction of said casing, said air damper further comprising a longitudinally extending rod within said casing which is inserted in the through bore of for guiding said piston.

11. An air damper, comprising:
a casing defining therein a hollow space;
a piston slidably guided within said casing in a longitudinal direction thereof, said piston has a through bore extending in the longitudinal direction;
a rod extending longitudinally within said casing and inserted in the through bore of for guiding said piston; and
a flexible separation member fixed to said piston and said casing and separating the hollow space of the casing into first and second chambers which are arranged adjacent to each other in said longitudinal direction, said first and second chambers being in communication with an outside of the casing via first and second openings, respectively;
wherein said piston comprises two sections, and one end of said separation member is clamped between said sections.

12. The air damper of claim 11, wherein one of said sections which faces away from said end of said separation member is guided on said rod.

13. The air damper of claim 11, wherein an end surface of one of the sections comprises a circumferential groove which is engaged by a circumferential rib of said end of said separation member.

14. The air damper of claim 11, wherein one of said sections which faces away from said separation member comprises an axial stop collar.

15. The air damper of claim 11, wherein said casing is a cylinder and an outer diameter of said piston is smaller than an inner diameter of said cylinder.

16. The air damper of claim 11, wherein said casing has an open end covered by a cover plate, and another end of said separation member is clamped between an end surface of the open end and the cover plate.

17. The air damper of claim 16, wherein the end surface has a circumferential groove which is engaged by a circumferential rib of said another end of said separation member.

18. The air damper of claim 11, wherein said piston and said casing are made of plastic material.

19. An air damper, comprising:
a casing defining therein a hollow space;
a piston slidably guided within said casing in a longitudinal direction thereof; and
a flexible separation member fixed to said piston and said casing and separating the hollow space of the casing into first and second chambers which are arranged adjacent to each other in said longitudinal direction, said first chamber being in communication with an outside of the casing, said second chamber being in communication with the outside of the casing via first and second openings;
wherein a cross section of the second opening is smaller than that of the first opening.

20. The air damper of claim 19, wherein the first opening is configured to only allow air to come in said second chamber while the second opening is configured to allow the air to both come in and go out of said second chamber.

21. The air damper of claim 20, wherein the first opening is configured to allow the air to come in only after a volume of said second chamber has increased by a predetermined amount.

22. An air damper, comprising:
a casing defining therein a hollow space;
a piston slidably guided within said casing in a longitudinal direction thereof;
a flexible separation member fixed to said piston and said casing and separating the hollow space of the casing into first and second chambers which are arranged adjacent to each other in said longitudinal direction, said first and second chambers being in communication with an outside of the casing; and
a piston rod extending from said piston, through an opening. formed in a wall of said first chamber of said casing, to the outside of said casing, said piston rod being loosely inserted through and spaced from a circumferential edge of the opening, thereby providing said communication between said first chamber and the outside of said casing.

23. The air damper of claim 22, wherein said separation member sealingly isolates said first and second chambers.

* * * * *